United States Patent
Fleming et al.

(10) Patent No.: US 8,806,081 B2
(45) Date of Patent: Aug. 12, 2014

(54) OPEN HOST ISSUED STATESAVE TO ATTACHED STORAGE

(75) Inventors: Mark Sean Fleming, Oro Valley, AZ (US); Lisa R. Martinez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 12/033,606

(22) Filed: Feb. 19, 2008

(65) Prior Publication Data

US 2009/0210574 A1      Aug. 20, 2009

(51) Int. Cl.
*G06F 3/00*       (2006.01)
*G06F 11/07*    (2006.01)
*G06F 11/20*    (2006.01)

(52) U.S. Cl.
CPC ........ *G06F 11/0757* (2013.01); *G06F 11/0778* (2013.01); *G06F 11/201* (2013.01)
USPC ............................................. 710/19; 710/17

(58) Field of Classification Search
USPC .......................................................... 710/19
See application file for complete search history.

(56) References Cited

U.S. PATENT DOCUMENTS

| | | | |
|---|---|---|---|
| 5,488,648 A | 1/1996 | Womble | |
| 5,619,644 A * | 4/1997 | Crockett et al. | 714/45 |
| 5,642,478 A | 6/1997 | Chen et al. | |
| 6,275,869 B1 * | 8/2001 | Sieffert et al. | 719/321 |
| 6,449,725 B2 * | 9/2002 | Deenadhayalan et al. | 713/324 |
| 7,287,223 B2 | 10/2007 | Smoliar et al. | |
| 7,634,595 B1 * | 12/2009 | Brown et al. | 710/38 |
| 2001/0056503 A1 * | 12/2001 | Hibbard | 709/250 |
| 2003/0208622 A1 * | 11/2003 | Mosier | 709/244 |
| 2004/0044865 A1 * | 3/2004 | Sicola et al. | 711/162 |
| 2005/0144511 A1 * | 6/2005 | Chih | 714/5 |
| 2006/0221838 A1 * | 10/2006 | Hartoin et al. | 370/242 |
| 2008/0076572 A1 * | 3/2008 | Nguyen et al. | 463/42 |
| 2008/0163256 A1 * | 7/2008 | Khanna et al. | 719/318 |

* cited by examiner

*Primary Examiner* — Henry Tsai
*Assistant Examiner* — John Roche
(74) *Attorney, Agent, or Firm* — Griffiths & Seaton PLLC

(57) ABSTRACT

A method to issue a statesave command from a host system to attached storage is provided. The attached storage is monitored for a predetermined threshold time to identify an inaccessible device. Upon expiration of the predetermined threshold time, the statesave command is issued from a device driver of the host system to the attached storage.

18 Claims, 2 Drawing Sheets

OPEN HOST ISSUED STATESAVE TO ATTACHED STORAGE

BACKGROUND OF THE INVENTION

1. Field of the Invention

The present invention relates in general to computers, and more particularly to a method and computer program product for issuing a statesave command to attached storage in a computer system.

2. Description of the Related Art

Computer systems, including data processing systems or subsystems, typically include numerous hardware and/or software components managing different aspects of the operation of the system. For example, components in a storage controller subsystem may include an operating system, device drivers, device adapters, host adapters, and cache management, to name just a few.

During normal operations, each component maintains a continuous log of state data. When the system encounters a significant, problem, the state data can be offloaded to a central buffer and subsequently saved to a non-volatile memory for later analysis and debugging. Such a save of state data may be referred to as a "statesave." In a conventional offload process, the components are called sequentially to save and offload their state data in a statesave procedure.

SUMMARY OF THE INVENTION

Due to the nature of the amount of state data stored in trace files, a statesave procedure must be completed in close proximity to the time of the problem, else there will not be enough data to perform a root cause analysis to determine the source of the problem. However, an automated solution for issuing a statesave command to host storage that takes advantage of inherent multipath host system architecture is not in currently in place.

In light of the foregoing, a need exists for a method and computer program product for providing an open host issued statesave command to attached storage by way of a device driver in a multipath host system architecture. Accordingly, in one embodiment, by way of example only, a method to issue a statesave command from a host system to attached storage is provided. The attached storage is monitored for a predetermined threshold time to identify an inaccessible device. Upon expiration of the predetermined threshold time, the statesave command is issued from a device driver of the host system to the attached storage.

In another embodiment, again by way of example only, a host system is provided. An application is operational on the host system. A device driver is responsive to the application. The device driver is configured to monitor the storage network for a predetermined threshold time to identify an inaccessible device, and upon expiration of the predetermined threshold time, issue a statesave command from the device driver of the host system to the attached storage.

In another embodiment, again by way of example only, a computer program product for issuing a statesave command from a host system to attached storage is provided. The computer program product comprises a computer-readable storage medium having computer-readable program code portions stored therein. The computer-readable program code portions include a first executable portion for monitoring the attached storage for a predetermined threshold time to identify an inaccessible device, and a second executable portion for, upon expiration of the predetermined threshold time, issuing the statesave command from a device driver of the host system to the attached storage.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
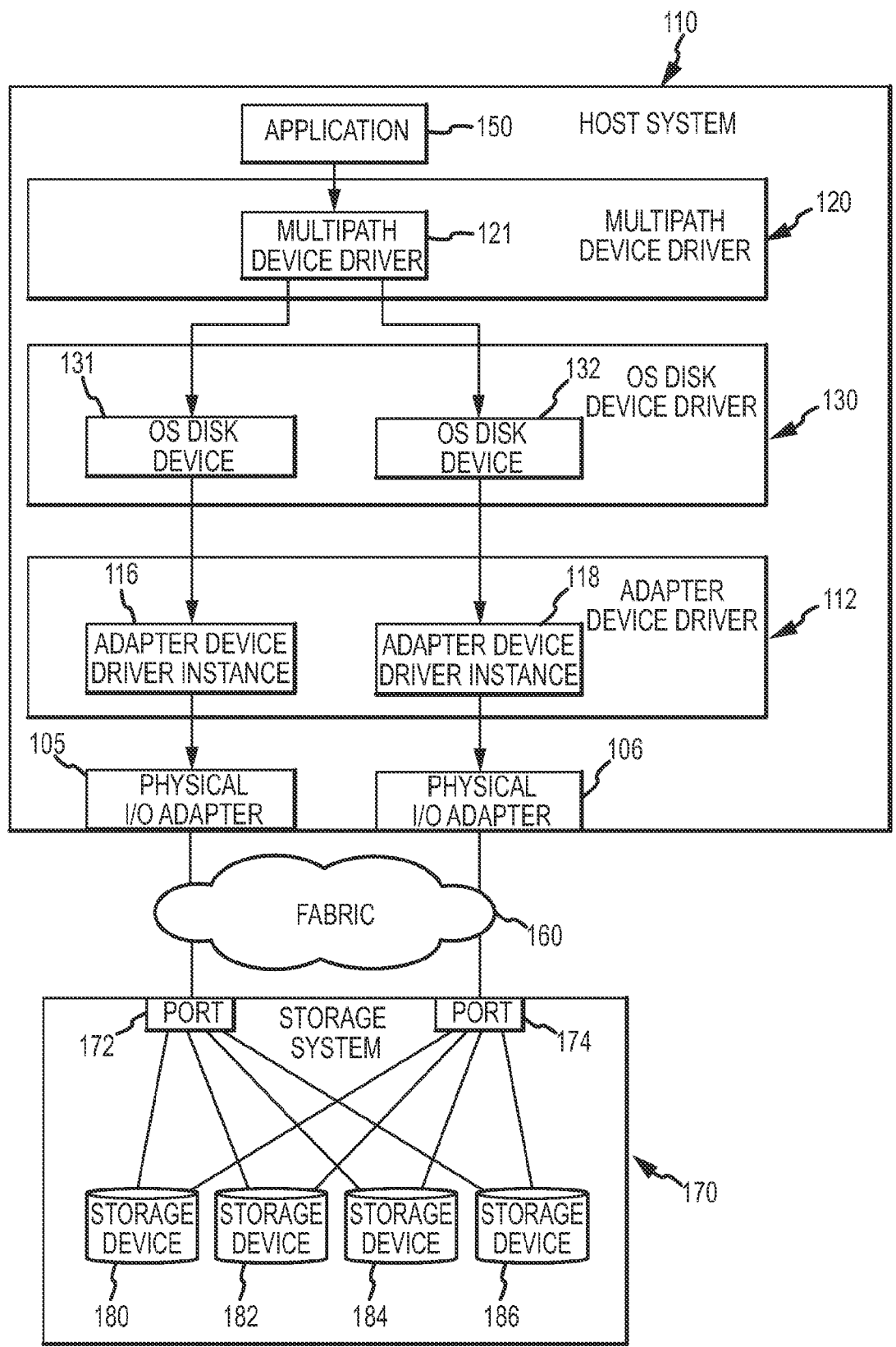
FIG. 1 depicts an exemplary block diagram of a data processing system architecture.

The illustrated embodiments below provide mechanisms for performing open host issued statesave commands to attached storage using multipath architecture device drivers. The mechanisms of the illustrative embodiments may be implemented in any data processing system in which multipath device drivers are utilized. FIG. 1 hereafter provides one example of a data processing system architecture in which the mechanisms of the illustrative embodiments may be implemented. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

FIG. 1 is an exemplar/ block diagram of a data processing system architecture in which exemplary aspects of an illustrative embodiment may be implemented. As shown in FIG. 1, a host system 110 is provided with a plurality of input/output (I/O) adapters 105 and 106. Each adapter 105 and 106 has associated instances 116 and 118 of an adapter device driver 112 running on the host system 110 through which I/O operation requests may be submitted to the I/O adapters 105 and 106. In addition, the host system 110 runs a multipath device driver 120 and an operating system disk device driver 130 that, provides operating system disk devices 131 and 132, which are instances of the operating system disk device driver 130 for each of the I/O adapter driver instances 116 and 118. The operating system disk device driver 130 provides a mechanism for communicating I/O operation requests from multipath device 121 running on the host system 110, to the I/O adapter driver instances 116 and 118 through the corresponding I/O adapter device driver 112.

The I/O adapters 105 and 106 may be connected to a fabric 160 which may comprise one or more networks or data processing devices, routers, switches, and the like, through which the I/O operation requests may be routed. The I/O operation requests are routed through the fabric 160 to an appropriate port 172, 174 of a storage system 170. The storage system 170 comprises a plurality of storage devices 180-186. I/O operation requests are sent to these storage devices 180-186 via the ports 172, 174 in a known manner. As shown, each port 172 and 174 provides a separate pathway for accessing each of the storage devices 180-186. Thus, in the depicted example, there are two pathways for accessing each storage device 180-186.

Moreover, there are multiple paths from the application 150 to the storage devices 180-186 by way of the multiple I/O adapters 105 and 106 and the multiple ports 172 and 174. The particular path chosen for accessing the storage devices 180-186 is determined by the multipath device driver 120 running on host system 110. The multipath device driver 120 may add appropriate routing information to I/O operation requests to ensure proper routing of the I/O operation requests through the selected path to a target storage device 180-186.

In operation, when the application 150 sends an I/O operation request to the multipath device driver 120, the multipath device driver 120 selects a path for the I/O operation request and sends the I/O operation request to the appropriate operating system disk, device 131 and 132. The operating system disk device driver 130 converts the I/O operation request from the application 150 into one or more appropriate I/O command(s) for the target storage device 180-186. The operating system disk device driver 130 sends the I/O command(s) to an associated I/O adapter device driver instance 116 and 118 via the operating system disk devices 131 and 132. The adapter device driver 112 is used as an interface to the I/O adapter hardware which transmits the I/O operation request to the appropriate port 172, 174 of the storage system 170.

In one illustrative embodiment, the I/O operation request specifies a logical unit number (LUN) of the storage device 180-186 that is the target of the I/O operation request. This LUN is used to convert the I/O request into I/O commands for the particular type of storage device and to route the I/O commands from the port 172, 174 to the appropriate storage device 180-186.

In an exemplary method of operation, an application 150 sends an I/O operation request to a multipath device driver 120, of which a multipath device is an instance. The multipath device has a plurality of paths from which a path may be selected for the particular I/O operation request. The multipath device selects an appropriate path and routes the I/O operation request down the selected path to the operating system disk device 131,132, which are instances of the operating system disk device driver 130. The operating system disk device 131,132, in turn, provides the I/O operation request to an I/O adapter device 116,118, which is an instance of the adapter device driver 112 and operates to transmit the I/O operation request to an appropriate port of a storage system via an associated I/O adapter 105, 106.

The multipath device may select one of the paths based on current conditions of the paths. For example, if an adapter associated with a particular path has failed, the multipath device will select the path for routing of the I/O operation request. If an adapter associated with a particular path is experiencing heavy I/O operation loads, then the multipath device may select a particular path associated with the opposing adapter if the adapter associated with the path has a relatively lower I/O operation load in order to balance the loads across both adapters.

Such multipath operations may be performed, for example, by the Subsystem Device Driver (SDD) available from International Business Machines, Inc., of Armonk, N.Y. SDD is a pseudo device driver designed to support multipathing that resides in a host system with a native disk device driver. SDD provides enhanced data availability, dynamic I/O load balancing across multiple paths, and automatic path failover protection. I/O operations are sent first to the SDD and then proceed from the SDD to the host disk driver after path selection by the SDD. When an active path experiences heavy loads or a failure, the SDD switches to another path dynamically. This path switching capability in SDD prevents a single failing adapter on a host system from disrupting data access.

The illustrative embodiments herein add functionality to multipath device drivers such, as SDD to issue a statesave command in the event of a predetermined contingency, such, as the expiration of an elapsed time. The illustrated embodiments may allow a setting in the device driver, based on customer and application requirements, that would issue a statesave command via the connection to the host adapter (e.g., fibre channel) to force a statesave operation. Use of the following embodiments provides the state data required for development to obtain root cause analysis of why a particular problem occurred (such as an inaccessible storage device), or rule out a problem with an attached storage device, for example. As a result, errors may be reduced and analyzable state data is increased, assisting in debugging efforts to eliminate problems.

Figure 2:
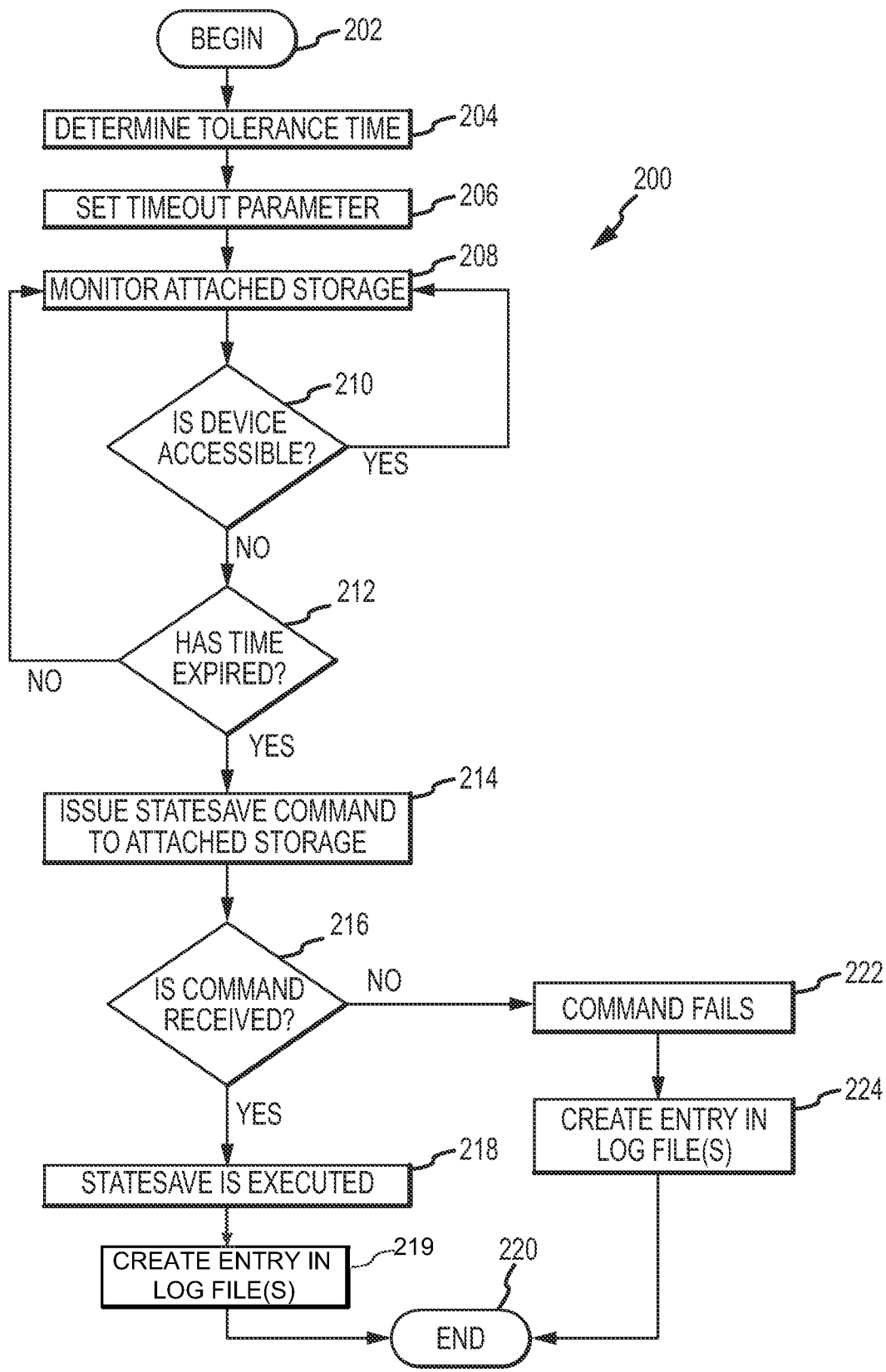
FIG. 2 depicts an exemplary method for issuing a statesave command from a host system to attached storage.

FIG. 2 depicts an exemplary method 200 of issuing a statesave command to attached storage in multipath computer environments as shown by FIG. 1. As one skilled in the art will appreciate, various steps in the method may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums. In the illustrated embodiments herein, many of the steps of the following method 200 may be initiated and/or performed by the multipath device driver operational on the host system as previously described.

Method 200 begins (step 202) by the determination of a tolerance time a host or application operable on the host system has relating to issues with inaccessible volumes (step 204). For example, various applications such as Advanced Interactive executive (AIX) may have an associated tolerance time relating to an inaccessible volume. In other words various applications and architectures may tolerate an inaccessible volume for a certain amount of time. This tolerance time varies across applications and systems, as one skilled in the art would anticipate.

Method 200 anticipates which application or system is relevant in a particular situation. For example, in an AIX environment, the method 200 recognizes that AIX is operable and determines a threshold time applicable to an AIX situation. Using the tolerance time, the method 200 sets a timeout parameter (step 206). For example, in an SDD environment, the method 200 may set a timeout parameter using a new command in SDD. The timeout parameter may set a predetermined threshold time, taking into account a particular tolerance time for a given application, in which the attached storage is monitored once an inaccessible volume or device is identified.

As a next step, the device driver monitors the attached storage (step 208). Such monitoring activity may include the identification of an inaccessible volume that starts a timer (step 210). In an SDD environment, SDD may monitor the attached storage using a subroutine (e.g., sddsrv). The monitoring activity may include a predetermined number of retries, where the driver attempts to contact the inaccessible volume. Once an inaccessible volume has been monitored until the expiration of the threshold time (step 212), the driver issues a statesave command through the existing fabric to the storage devices (step 214).

If the statesave command is received (step 216), the statesave command is executed by attached storage (step 218) and state data is collected. A confirmation may be received that the statesave has been performed, indicating that the statesave command was successfully received and executed. The device driver creates an entry in relevant log file(s) to document the successful execution of the command (step 219). The method 200 then ends (step 220).

On the contrary, if the statesave command is not received (e.g., due to a network issue, a similar problem, or even a catastrophic failure of attached storage), the statesave command fails (step 222). The device driver then creates an entry in relevant log file(s) to document the command failure (step 224). The method 200 ends (again, step 220).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method to issue a statesave command from a multi-path host system to attached storage, comprising:
    dynamically switching to at least one of a plurality of active paths of the multi-path host system for automatic failover protection and issuing a statesave command upon detecting the inaccessible device;
    determining a tolerance time for a host and an application operable on the multi-path host system for tolerating an inaccessible device thereby setting a timeout parameter using the tolerance time, including at least determining an application tolerance time for tolerating an inaccessible device for each of a plurality of applications in association with the multi-path host system application;
    anticipating which application or host is relevant for a particular situation for determining the tolerance time;
    setting the timeout parameter using a predetermined threshold time by taking into account the application tolerance time determined for each one of the plurality of applications, and if the multi-path host system includes a subsystem device driver (SDD) the timeout parameter is set using a new command in the SDD, wherein the SDD is a pseudo device driver that supports multi-paths residing in multi-path host system having a device driver;
    monitoring the attached storage for the predetermined threshold time to identify an inaccessible device, wherein the monitoring includes at least starting a timer and using a subroutine if the multi-path host system uses the SDD and performing a predetermined number of retries to attempt to contact the inaccessible device;
    upon expiration of the predetermined threshold time, issuing the statesave command from a device driver of the multi-path host system through a fabric to one of a plurality of ports on the attached storage;
    executing the statesave command and collecting state data if the statesave command is received;
    providing a confirmation that the state save command was received and executed; and
    upon a successful execution of the state save command, creating an entry in a log file of the device driver for documenting the successful execution of the state save command.

2. The method of claim 1, further including, upon a failure of the statesave command, creating an entry in a log file of the device driver.

3. The method of claim 1, wherein monitoring the attached storage includes executing the predetermined number of retries to the inaccessible device using the device driver for the predetermined threshold time.

4. A multi-path host system to issue a statesave command from the multi-path host system to attached storage, comprising:
    the multi-path system;
    the attached storage in communication with the multi-path system;
    an application operational on the multi-path host system and in communication with the attached storage;
    a host operational on the multi-path host system and in communication with the attached storage; and
    a device driver responsive to the application and host,
    a subsystem device driver (SDD) operational in the multi-path host system;
    at least one processor device in communication with the device driver and the multi-path host system, wherein the at least one processor device:
        dynamically switches to at least one of a plurality of active paths of the multi-path host system for automatic failover protection and issuing a statesave command upon detecting the inaccessible device,
        determines a tolerance time for the host and the application operable on the multi-path host system for tolerating an inaccessible device thereby setting a timeout parameter using the tolerance time, including at least determining an application tolerance time for tolerating an inaccessible device for each of a plurality of applications in association with the multi-path host system application,
        anticipates which application or host is relevant for a particular situation for determining the tolerance time,
        sets the timeout parameter using the predetermined threshold time by taking into account the application tolerance time determined for each one of the plurality of applications, and if the multi-path host system includes the subsystem device driver (SDD) the timeout parameter is set using a new command in the SDD, wherein the SDD is a pseudo device driver that supports multi-paths residing in multi-path host system having a device driver,
        monitors for the predetermined threshold time to identify an inaccessible device, wherein the monitoring includes at least starting a timer and using a subroutine if the multi-path host system uses the SDD and performing a predetermined number of retries to attempt to contact the inaccessible device, and
        executes the statesave command and collecting state data if the statesave command is received,
        provides a confirmation that the state save command was received and executed,
        upon expiration of the predetermined threshold time, issue a statesave command from the device driver of the multi-path host system through a fabric to one of a plurality of ports on the attached storage, and upon a successful execution of the state save command, create an entry in a log file of the device driver for documenting the successful execution of the state save command.

5. The system of claim 4, wherein the device driver is further configured to, upon a failure of the statesave command, create an entry in a log file.

6. The system of claim 4, wherein the device driver is further configured to execute the predetermined number of retries to the inaccessible device using the device driver for the predetermined threshold time.

7. A computer program product for issuing a statesave command from a multi-path host system to attached storage, the computer program product comprising a non-transitory computer-readable storage medium having computer-readable program code portions stored therein, the computer-readable program code portions comprising:

a first executable portion for dynamically switching to at least one of a plurality of active paths of the multi-path host system for automatic failover protection and issuing a statesave command upon detecting the inaccessible device a second executable portion for determining a tolerance time for a host and an application operable on the multi-path host system for tolerating an inaccessible device thereby setting a timeout parameter using the tolerance time, including at least determining an application tolerance time for tolerating an inaccessible device for each of a plurality of applications in association with the multi-path host system application;

a third executable portion for setting the timeout parameter using the predetermined threshold time by taking into account the application tolerance time determined for each one of the plurality of applications, and if the multi-path host system includes a subsystem device driver (SDD) the timeout parameter is set using a new command in the SDD, wherein the SDD is a pseudo device driver that supports multi-paths residing in multi-path host system having a device driver;

a fourth executable portion for monitoring the attached storage for the predetermined threshold time to identify an inaccessible device, wherein the monitoring includes at least starting a timer and using a subroutine if the multi-path host system uses the SDD and performing a predetermined number of retries to attempt to contact the inaccessible device;

a fifth executable portion for, upon expiration of the predetermined threshold time, issuing the statesave command from a device driver of the multi-path host system through a fabric to one of a plurality of ports on the attached storage;

a sixth executable portion for executing the statesave command and collecting state data if the statesave command is received;

a seventh executable portion for providing a confirmation that the statesave command was received and executed; and an eighth executable portion for, upon a successful execution of the state save command, creating an entry in a log file of the device driver for documenting the successful execution of the state save command.

8. The computer program product of claim 7, further including a ninth executable portion for, upon a failure of the statesave command, creating an entry in a log file of the device driver.

9. The computer program product of claim 7, further including a ninth executable portion for executing a the predetermined number of retries to the inaccessible device using the device driver for the predetermined threshold time.

10. The method of claim 1, further including, in association with the monitoring, performing:
performing a load balancing operation for Input/Output (I/O) commands across the multipath host system.

11. The method of claim 1, further including, subsequent to the issuing, executing the statesave command by the attached storage and collecting the state data.

12. The system of claim 4, wherein the device driver is further configured to, in association with the monitoring:
execute a load balancing operation for Input/Output (I/O) commands across the multipath host system.

13. The system of claim 4, wherein the device driver is further configured to execute the issued statesave command by the attached storage and collect the state data.

14. The computer program product of claim 7, further including a ninth executable portion for:
executing a load balancing operation for Input/Output (I/O) commands across the multipath host system.

15. The computer program product of claim 7, further including a ninth executable portion for, subsequent to the issuing, executing the statesave command by the attached storage and collecting the state data.

16. The method of claim 1, wherein monitoring further includes:
identifying an inaccessible volume that starts a timer, and attempting to contact the inaccessible volume for a predetermined number of retries.

17. The system of claim 4, wherein the device driver is further configured to, in association with the monitoring:
identify an inaccessible volume that starts a timer, and attempt to contact the inaccessible volume for a predetermined number of retries.

18. The computer program product of claim 7, further including a ninth executable portion for:
identifying an inaccessible volume that starts the timer, and attempting to contact the inaccessible volume for a predetermined number of retries.

* * * * *